US008649607B1

(12) United States Patent
Hayat et al.

(10) Patent No.: US 8,649,607 B1
(45) Date of Patent: Feb. 11, 2014

(54) SPECTRAL RATIO CONTRAST FOR EDGE DETECTION IN SPECTRAL IMAGES

(75) Inventors: Majeed M. Hayat, Albuquerque, NM (US); Sanjay Krishna, Albuquerque, NM (US); Biliana Stefanova Paskaleva, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 410 days.

(21) Appl. No.: 13/013,744

(22) Filed: Jan. 25, 2011

Related U.S. Application Data

(60) Provisional application No. 61/336,653, filed on Jan. 25, 2010.

(51) Int. Cl.
*G06K 9/00* (2006.01)
*G06K 9/46* (2006.01)

(52) U.S. Cl.
USPC ........... 382/199; 382/159; 382/165; 382/173; 382/181; 382/191

(58) Field of Classification Search
USPC .......................... 382/199, 159, 165, 173, 181
See application file for complete search history.

(56) References Cited

U.S. PATENT DOCUMENTS

| 8,311,338 | B2 * | 11/2012 | Stein et al. | 382/191 |
|---|---|---|---|---|
| 2003/0219172 | A1 * | 11/2003 | Caviedes et al. | 382/286 |
| 2008/0075371 | A1 * | 3/2008 | Dana et al. | 382/199 |

OTHER PUBLICATIONS

Resmini, R.G. "Hyperspectral/Spatial Detection of Edges (HySPADE): An Algorithm for Spatial and Spectral Analysis of Hyperspectral Information." Algorithms and Technologies for Multispectral, Hyperspectral, and Ultraspectral Imagery X, SPIE. 5425. (2004): 433-442. Print.*

Andrews, et al. U.S. Government. Naval Research Laboratory. Spectrum Tunable Quantum dot-in-a-well Infrared Detector Arrays for Thermal Imaging. Kirtland AFB, NM, 2008. Print.*

Sohn, et al. "Supervised and Unsupervised Spectral Angle Classifiers." Photogrammetric Engineering & Remote Sensing. 68.12 (2002): 1271-1280. Print.*

Gomez-Chova, et al. "Correction of Systematic Spatial Noise in push-broom hyperspectral sensors: application to CHRIS/PROBA images." Applied Optics. 47.28 (2008): 46-60. Print.*

* cited by examiner

*Primary Examiner* — Michael A Newman
(74) *Attorney, Agent, or Firm* — Schwegman Lundberg & Woessner, P.A.

(57) ABSTRACT

Apparatus, systems, and methods integrating spectral information with spatial feature extraction of image data, providing simultaneous spatial and spectral feature selection of the image data, can be used in a variety of applications. In various embodiments, an edge signature for the edge between two materials can be defined using ratios of identified spectral bands, where the edge signature can be combined with a spatial mask to obtain a joint spatio-spectral mask. Additional apparatus, systems, and methods are disclosed.

23 Claims, 10 Drawing Sheets

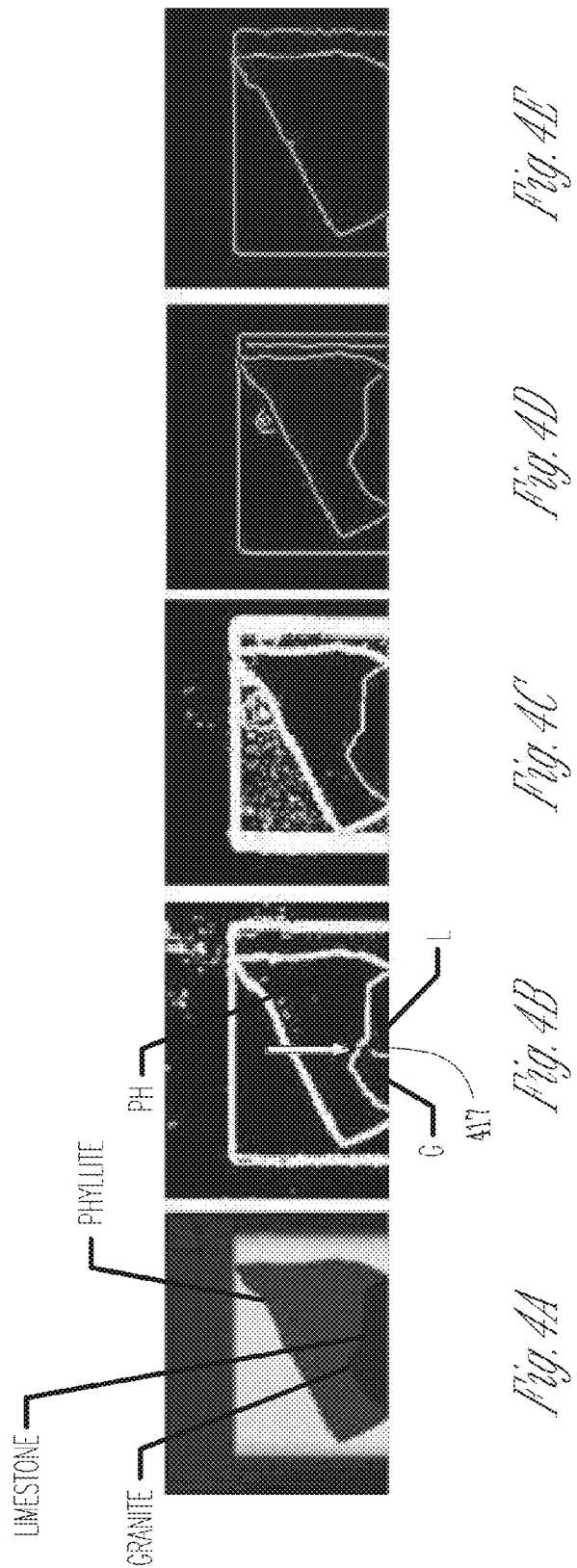

910:
| $\omega(-1,1)$ | $\omega(0,1)$ | $\omega(1,1)$ |
| --- | --- | --- |
| $\omega(-1,0)$ | $\omega(0,0)$ | $\omega(1,0)$ |
| $\omega(-1,-1)$ | $\omega(0,-1)$ | $\omega(1,-1)$ |

SPECTRAL RATIO CONTRAST FOR EDGE DETECTION IN SPECTRAL IMAGES

RELATED APPLICATION

This application claims priority under 35 U.S.C. 119(e) from U.S. Provisional Application Ser. No. 61/336,653, filed 25 Jan. 2010, which application is incorporated herein by reference in its entirety.

GOVERNMENT INTEREST STATEMENT

This invention was made with Government support under Grant No. National Science Foundation 0925757 and Los Alamos National Labs OVPR 22494 and. The United States Government has certain rights in the invention.

FIELD OF THE INVENTION

The invention relates generally to digital image processing and image analysis.

BACKGROUND

Image segmentation is one of the most important and difficult tasks in digital image processing and image analysis. It represents a key stage of automated image analysis and interpretation. Segmentation algorithms for gray-scale images utilize basic properties of intensity values such as discontinuity and similarity. Detection of discontinuities in gray-scale images is typically based on spatial masks whose response at any pixel in the image can be thought of as a finite difference approximation of a differential operator. A mask, which can be used in a typical spatial feature extraction techniques and may also be referred to as kernel, can be realized as a function that operates on pixel values in a predefined neighborhood M×N of a pixel with spatial coordinates (i, j). Examples of some of the most popular gray-scale edge detectors include Canny, Sobel, and Prewitt detectors. However, it is possible to enhance edge-detection capability by means of using spectral information provided by multispectral (MS) or hyperspectral (HS) imagery. A multi-spectral imagery captures image data at specific frequencies across the electromagnetic spectrum. Hyperspectral imagery captures image data from across the electromagnetic spectrum.

Transition from a gray-scale to a multi-color image complicates edge detection significantly. Standard definition of a gray-scale edge as a "ramp," or "ridge" between two regions is no longer appropriate since a multi-color image has multiple image planes, one for each spectral band. More importantly, depending upon the scene, two distinct regions may exhibit the same intensity for one or more bands. In other words, with respect to such iso-luminant bands, the edge between the two regions is characterized by a jump in color rather than intensity. Clearly, iso-luminant edges cannot be detected by a standard gradient operator. Extension of other gray-scale processing techniques to multi-colored images, such as those based on differential operators, faces similar difficulties.

Extension of differential edge detection to multi-color images has followed two principal paths. A straightforward approach is to apply differential operators such as the gradient separately to each image plane and then somehow integrate this information to obtain edge and segmentation information. It has been previously pointed out that this can result in undesirable segmentation because information in separate channels is treated as independent whereas in actuality it is not. A second approach to multi-color edge detection is to embed the variations of all color channels in a single measure, which is then used to obtain the edge maps. Typically, this approach is developed by starting from a given gray-scale operator, which is then extended consistently to multi-color images. By "consistently" it is mean that the extended multi-color operator reduces to its original gray-scale prototype when applied to a single color image. Two representative examples of this approach are the multi-color gradient (MCG) and the morphological color gradient (MoCG). While multi-color gradient and related ideas have been used with great success computation of the multi-color gradient for multi-color images with large numbers of bands can be quite expensive.

BRIEF DESCRIPTION OF THE DRAWINGS

Embodiments of the invention are illustrated by way of example and not limitation in the figures of the accompanying drawings in which:

FIGS. 4A-E show comparisons between edge maps obtained by spectral ratio contrast and three benchmark edge detectors, in accordance with various embodiments.

FIG. 9 shows a three by three section of a single-band image and a three by three spatial mask, in accordance with various embodiments.

DETAILED DESCRIPTION

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

For multi-color, MS, or HS images, such an image is a three-dimensional array of real numbers, also called an image hypercube:

$$u \in \mathbf{R}^{I \times J \times K}; u=\{u_k(i,j) \in \mathbf{R} : 1 \le i \le I, 1 \le j \le J, 1 \le k \le K\} \quad (1)$$

For fixed i and j, the k-dimensional vector $u(i, j)=(u_1(i, j), \ldots, u_K(i, j))$ is called hyper-pixel. The indices i and j denote the spatial position of the hyper-pixel within a Focal Plane Array (FPA), and k is the band number. The value of $u_k(i; j)$ is referred to as the intensity of the k-th band. Alternatively, for a fixed k, the two dimensional array $u_k(i, j)$ is the k-th image plane, or color slice, of the multi-color image. For MS images the number of bands K is typically between 10 and 15. For hyperspectral images K can be as high as several hundred bands.

In various embodiments, image segmentation algorithms for multi-color images with an emphasis on detection of multi-color edges can be provided. In an example embodiment, an algorithm for joint spatio-spectral (JSS) feature selection can be implemented. By "joint," it is meant that spatial and spectral characteristics of a given multispectral (MS) or hyperspectral (HS) image are simultaneously taken into consideration. JSS feature selection can offer unique opportunities for image processing and remote sensing as it enables taking advantage of the correlation between spatial and spectral features.

Figure 1:
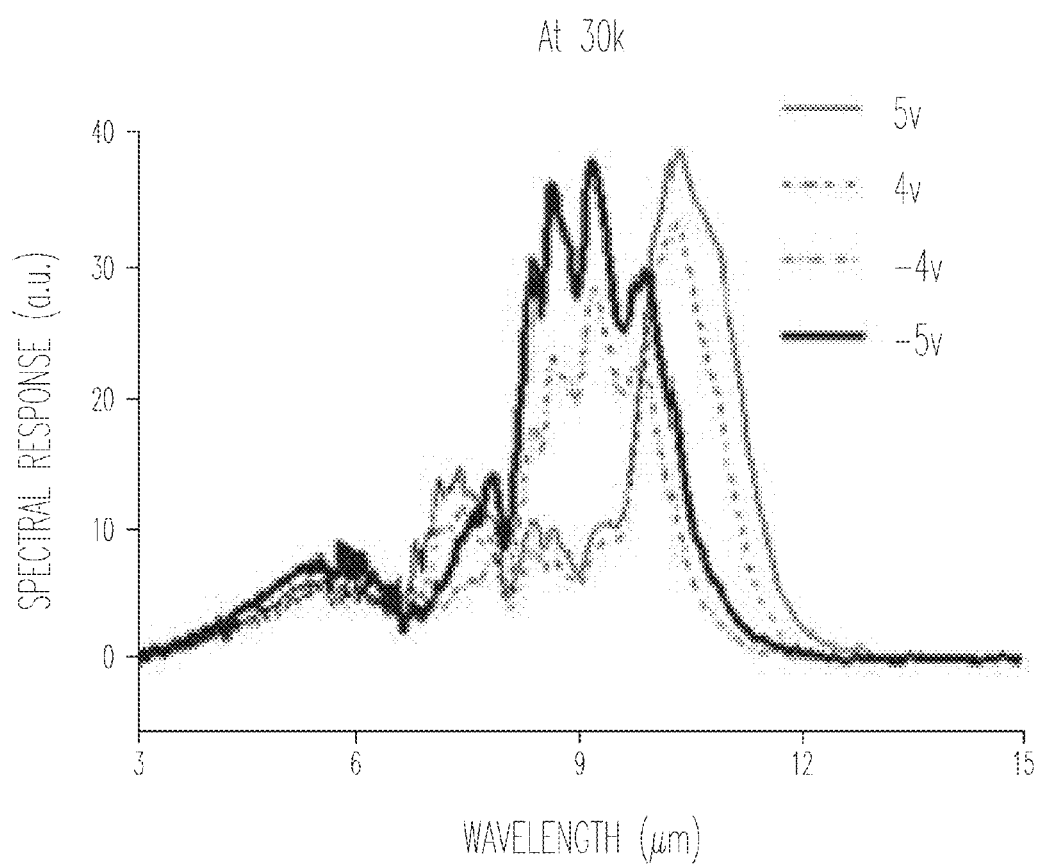
FIG. 1 shows bias tunable spectral bands of a quantum-dot in a well sensor, in accordance with various embodiments.

Spectral ratio signatures can be used in an approach for JSS-based edge detection, termed spectral ratio contrast (SRC) edge-detection algorithm. The SRC can be verified using MS and HS imagery from a quantum-dot in a well (DWELL) infrared (IR) focal plane array (FPA), and the Airborne Hyperspectral Imager (AHI), respectively. The DWELL FPA is a special type MS imager, characterized by the unique property that its spectral bands are selected electrically by altering the applied bias as shown in FIG. 1.

Figure 2:
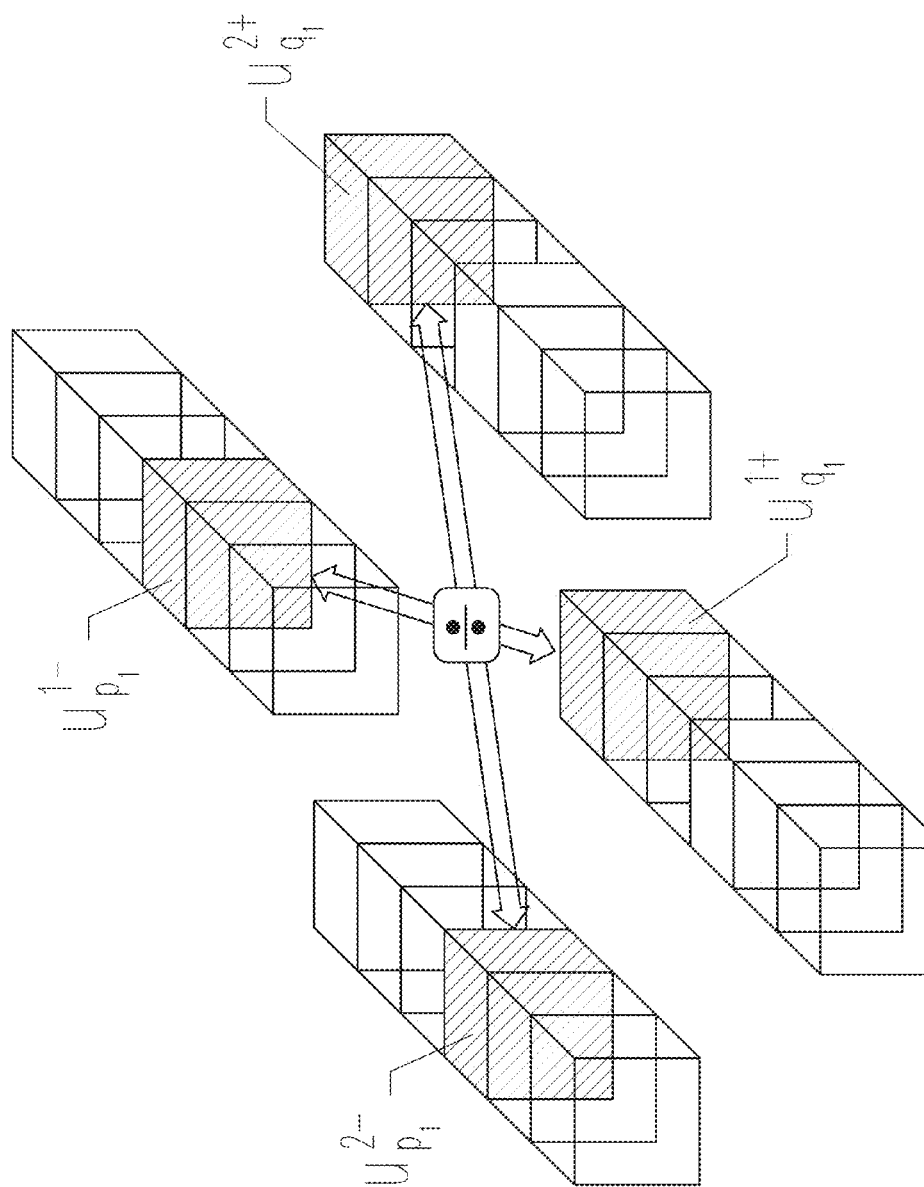
FIG. 2 shows an example of a joint spatio-spectral mask, in accordance with various embodiments.

In an example embodiment, spectral ratio contrast, namely band ratios, can be used to define an edge signature for an edge between two materials. The edge signature provides an index. The edge signature represents an optimized combination of spectral ratios calculated using bands that enhance the spectral contrast between the two materials. In conjunction with a spatial mask, the edge signatures give rise to a multi-spectral operator that can be viewed as non-separable with respect to the spectral and spatial domains, three-dimensional extension of the spatial mask. In the extended mask, the third (spectral) dimension of each hyper-pixel can be chosen independently. Such a mask does not operate in a single image plane but instead fuses information from multiple planes. FIG. 2 shows an example of a non-separable spatio-spectral mask.

In an example embodiment, a SRC approach can include two stages. The first stage can be implemented as a training stage, which identifies the bands that maximize the spectral contrast between two given materials. A small subset of ratios that can reliably discriminate the edge between two materials from other spatial features is selected. Such a subset can be referred to as a spectral ratio index or signature of the edge. In order to extract spatial features such as edges, the edge signatures can be combined with a suitable spatial mask to obtain a joint spatio-spectral SRC mask. Obtaining the joint spatio-spectral SRC mask provides a second stage of SRC, that is, the second stage provides a feature extraction step using the three-dimensional mask defined by the bands selected at the training stage. Note that in SRC, a spatial mask is used in a fundamentally different manner from the standard use of a mask as used in the context of gray-scale images. Whereas in gray-scale edge detection the response is single-valued, in SRC the response is multi-valued, returning the ratios of suitably defined pixel pairs from that structuring element. Starting from a given spatial mask, a JSS SRC mask can be defined by retaining the spatial domain of the former and redefining its action in terms of spectral ratios corresponding to the bands from a given edge signature.

The presence of two stages in SRC provides an important distinction from the MCG-based edge detection and other unsupervised edge detection algorithms. A second difference arises from the fact that SRC is not derivative based, i.e., in SRC edge detection is effected by matching a given edge signature rather than by measuring the gradient magnitude. Because the edge signatures and the associated tolerance values are determined independently for each pair of classes of materials, the edge extraction depends only on the quality of the selection criteria used to obtain the edge signature for a given pair and not on the strength of the edge as measured by its MCG value. As a result, the SRC approach is particularly well suited to situations where the edge between two given materials is "weak," as measured by its MCG value.

Figure 3C:
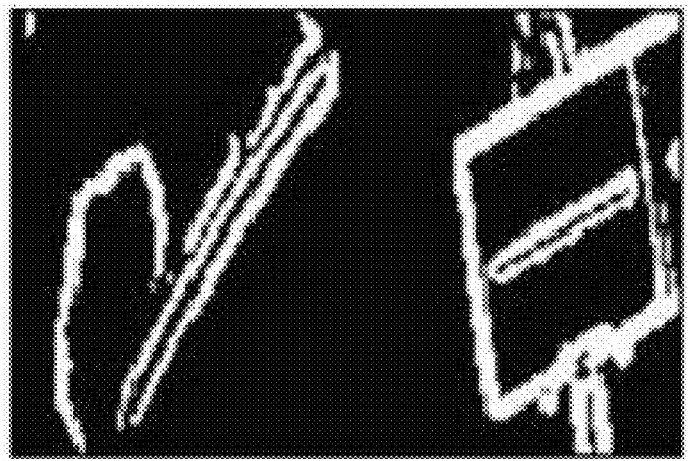
FIGS. 3A-C show an image using an airborne hyperspectral imager and corresponding images in a spectral ratio contrast edge map and in a multi-color gradient edge map, in accordance with various embodiments.
Figure 3B:
Figure 3A:
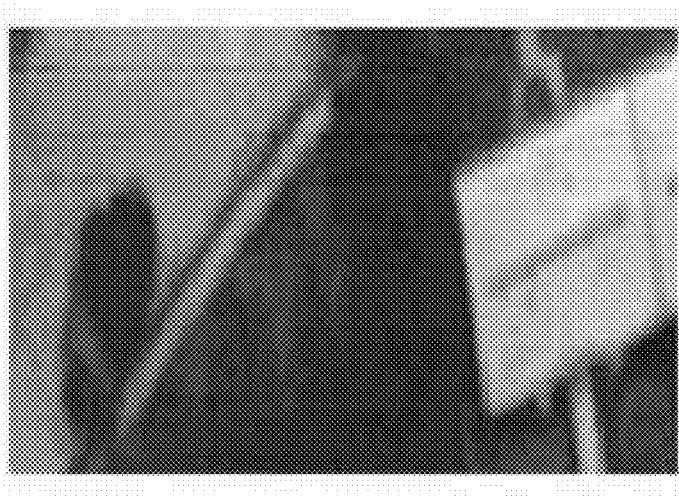

FIGS. 3A-C show an image using an airborne hyperspectral imager and corresponding images in a spectral ratio contrast edge map and in a multi-color gradient edge map. FIG. 3A shows an AHI test image. FIG. 3B shows a edge map derived using the SRC algorithm. FIG. 3B shows a edge map obtained by the MCG approach. As seen, FIGS. 3B and 3C compares edge maps of the two approaches with those applied to the AHI test image. The results show that compared to MCG approach, the SRC generates slightly improved edge maps.

FIGS. 4A-E show comparisons between edge maps obtained by spectral ratio contrast and three benchmark edge detectors. FIG. 4A shows a DWELL FPA image of a structure comprising phyllite (Ph), granite (G), and limestone (L) at a bias of 0.7 V. FIG. 4B shows a SRC edge map for the structure, where the detected weak edge between granite and limestone is identified by the arrow 417. FIG. 4C shows a MCG edge map for the structure. FIG. 4D shows a Canny edge map at a bias of 0.5 V for the structure. FIG. 4E shows a Sobel edge map at a bias of 0.5 V for the structure. As can be seen, FIGS. 4A-E compare the edge maps derived using the SRC algorithm with those obtained by the MCG approach and by the application of two well-known grayscale edge detectors to individual DWELL FPA spectral bands. FIG. 4B clearly shows the ability of the SRC to capture the very weak, almost iso-luminant edge between the granite and limestone classes in this scene (as point out by arrow 417), which is missed by the other approaches. Based on these and other results obtained using AHI and DWELL FPA imagery, it may be concluded that for moderately difficult scenes in which the edges are of approximately the same strength, as measured by their MCG values, the SRC and the MCG edge detectors generate essentially identical edge maps. However, for more challenging imagery containing both "weak" and "strong" edges, the SRC may outperform the MCG edge detector by a wide margin. The single, non-adaptive threshold in the MCG algorithm may require an increase in the tolerance to a point where the noise level may become unacceptable. As such, the MCG is not generally adaptive to types of materials, while the SRC provides a supervised approach with more degrees of freedom to suit various edges from different materials. This provides an example of a SRC approach.

In various embodiments, application of spectral ratios to define MS and HS operators for edge detection can be implemented. Besides the potential for significant data compression in HS and MS image processing, spectral ratios appear to be particularly well-suited for intelligent sensing modalities using a spectrally tunable sensor, such as the electrically tunable DWELL FPA. For example, a training stage in a SRC approach can extract information about the most informative, with respect to edge detection, bias voltages (bands) in the sensed image. Image acquisition for a scene can then be carried out using only the relevant biases, thereby significantly reducing the amount of data necessary for the image segmentation.

Figure 5:
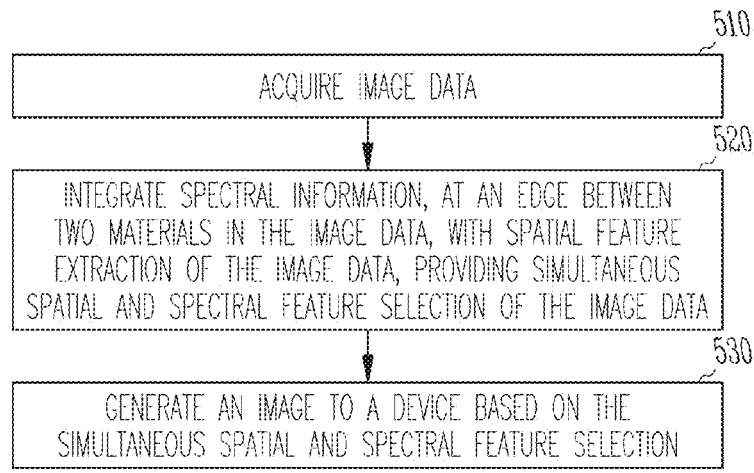
FIG. 5 shows features of a method of providing an image, in accordance with various embodiments.

FIG. 5 shows features of an embodiment of a method of providing an image. At 510, image data is acquired. Acquisition of image data can include using only a set of biases determined to be relevant biases to sense the image data. At 520, spectral information, at an edge between two materials in the image data, is integrated with spatial feature extraction of the image data, providing simultaneous spatial and spectral feature selection of the image data. Integrating spectral information can include using spectral ratios at the edge. Information regarding bias voltages to a sensor in sensing the image data can be extracted to integrate the spectral information. At 530, an image is generated to a device based on the simultaneous spatial and spectral feature selection.

Figure 6:
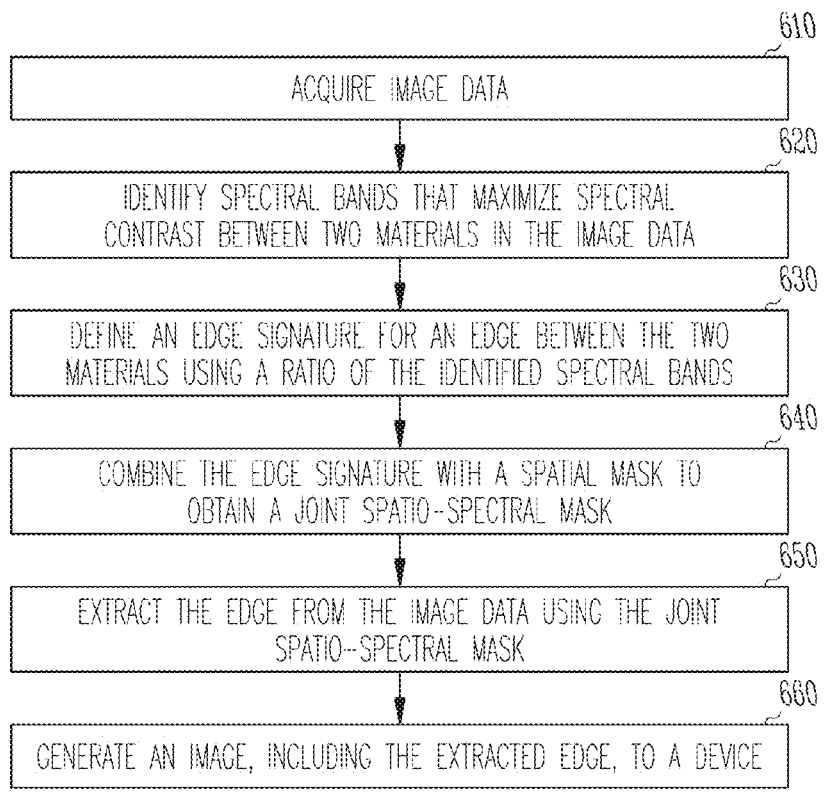
FIG. 6 shows features of a method of providing an image, in accordance with various embodiments.

FIG. 6 shows features of an embodiment of a method of providing an image. At 610, image data is acquired. Acquisition of image data can include using only a set of biases determined to be relevant biases to sense the image data. At 620, spectral bands that maximize spectral contrast between two materials in the image data can be identified. At 630, an edge signature for an edge between the two materials can be defined using a ratio of the identified spectral bands. At 640, the edge signature can be combined with a spatial mask to obtain a joint spatio-spectral mask. Information regarding bias voltages to a sensor in sensing the image data can be extracted to integrate the spectral information. At 650, the edge can be extracted from the image data using the joint spatio-spectral mask. At 660, an image, including the extracted edge, can be generated to a device.

Figure 7:
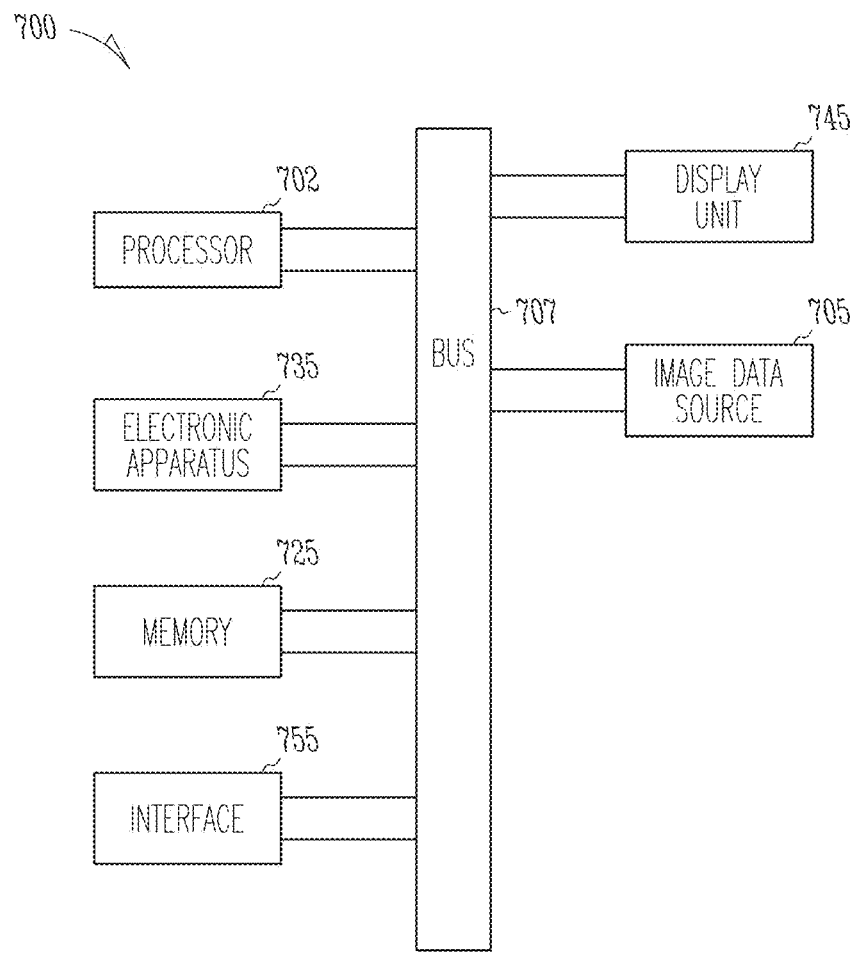
FIG. 7 shows an example embodiment of an apparatus 700 operable to provide images, in accordance with various embodiments.

FIG. 7 shows an example embodiment of an apparatus 700 operable to provide images. Apparatus includes an interface 755 to receive image data, a processor 702, and a memory 725 operatively coupled to processor 702. In an embodiment, processor 702 can be realized as a processor or a group of processors that may operate independently depending on an assigned function.

Memory 725 can include instructions stored thereon to operate according to algorithms and techniques discussed herein including, but not limited to, the methods associated with FIGS. 5 and 6. Memory 725 can have instructions stored thereon, which when executed by the processor, cause the apparatus to perform operations to acquire image data; to integrate spectral information, at an edge between two materials in the image data, with spatial feature extraction of the image data, providing simultaneous spatial and spectral feature selection of the image data; and to generate an image to a device based on the simultaneous spatial and spectral feature selection. Memory 725 can be realized as any type of storage medium. Memory 725 provides a machine-readable storage medium, which can have instructions stored thereon such that when the instructions are executed by processor 705, apparatus 700 can perform operations including processing image data according to the teachings herein.

Apparatus 700 can be arranged to integrate spectral information using spectral ratios at the edge between two materials. In addition, memory 725 can include instructions extracting information regarding bias voltages to a sensor in sensing the image data to integrate the spectral information. The instructions include instructions to identify spectral bands that maximize spectral contrast between the two materials in the image data; to define an edge signature for the edge between the two materials using ratios of the identified spectral bands; to combine the edge signature with a spatial mask to obtain a joint spatio-spectral mask; to extract the edge from the image data using the joint spatio-spectral mask; and to generate the image, including the extracted edge, to the device.

Interface 755 can be arranged to receive image data from an image data source 705. Image data source 705 can be realized as a sensor or as a repository of image data collected from a sensor. Image data source 705 can include, but is not limited to, a quantum-dot in a well (DWELL) infrared (IR) focal plane array (FPA). Image data source 705 can be coupled directly to interface 755. Image data source 705 can be coupled to interface 755 via bus 707. Image data source 705 can be coupled to interface 755 via other communication mechanisms.

Bus 707 can provide electrical conductivity among the components of system 700. Bus 707 can include an address bus, a data bus, and a control bus, each independently configured. Bus 707 can be realized using a number of different communication mediums that allows for the distribution of components of system 700. Use of bus 707 can be regulated by processor 702. Bus 707 provides a mechanism to operatively couple sensor 704 to a processing unit, such as provided by processor 702 and memory 725. The processing unit may be realized as an integrated unit as a distributed unit and may include other components of system 700.

Display units 745 can be arranged to receive images processed using various algorithms and techniques as taught herein. Display units 745 can be realized as a video display, a printing unit, a memory that stores the processed image data in formats useable by other devices, or other devices that operate with processed data images. In various embodiments, electronic apparatus 735 can include additional display units, additional storage memory, and/or other control devices that may operate in conjunction with processor 702 and/or memory 725.

Figure 8:
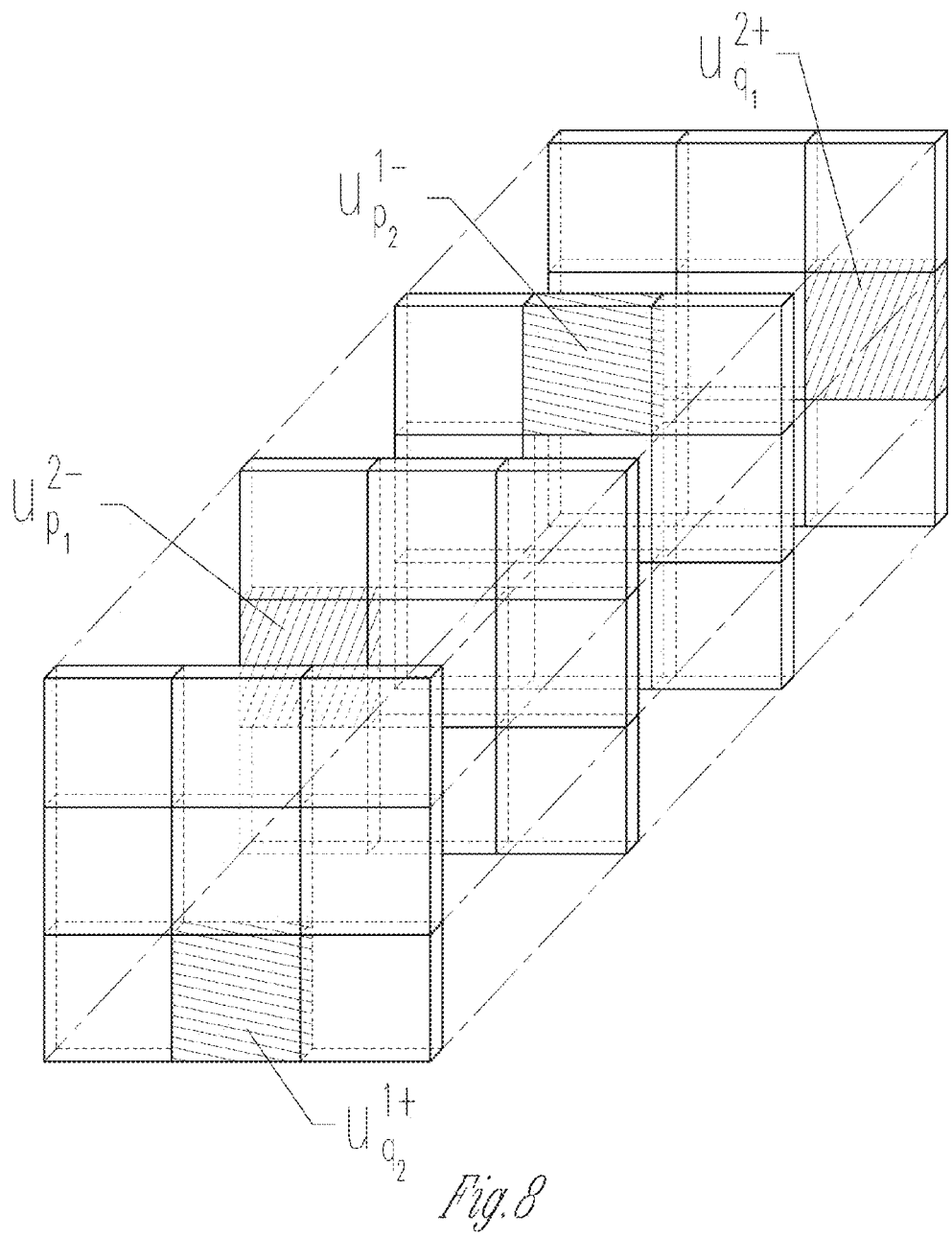
FIG. 8 shows a fusion of spectral edge signatures with a spatial mask that yields a non-separable joint spatio-spectral mask, in accordance with various embodiments.

In various embodiments, spectral ratio contrast, i.e., band ratios, can be used to define an edge signature (index) for an edge between two materials. The edge signature represents a combination of spectral ratios calculated using bands that enhance the spectral contrast between the two materials. In conjunction with a spatial mask, the edge signatures give rise to a multispectral operator that can be viewed as a three-dimensional extension of the spatial mask as shown in FIG. 8. In the extended mask, the third (spectral) dimension of each hyper-pixel can be chosen independently. Such a mask does not operate in a single image plane but instead fuses information from multiple planes.

Consider the following development of an example joint spatio-spectral SRC (spectral ratio contrast) approach for edge detection in MS and HS images. Given two distinct materials A and B, a unique signature $\epsilon_{AB}$ for the edge $E_{AB}$ between A and B can be created using the spectral ratios of their hyper-pixels. In other words, those bands from A and B whose ratios can best discriminate $E_{AB}$ from the rest of the spatial features in the scene are sought.

$E_{AB}$ can be defined as the set of hyper-pixels on the boundary between A and B. Thus, pixels belonging to $E_{AB}$ are characterized by the existence of small neighborhoods containing elements from both A and B. Let $$a=(a_1,\ldots,a_K)\in \mathbf{R}^K \text{ and } b=(b_1,\ldots,b_K)\in \mathbf{R}^K \quad (2)$$

denote the representative hyper-pixels of A and B, respectively. For example, a and b may correspond to the class-means determined from a training set. In what follows, given a vector $c \in R^K$, the following notation can be used $$1/c \triangleq (1/c_1, \ldots, 1/c_K). \tag{3}$$

The spectral ratio index between A and B can be defined as the following K×K matrix:

$$A/B \triangleq a^T(1/b) = \begin{pmatrix} \frac{a_1}{b_1} & \frac{a_2}{b_2} & \cdots & \frac{a_1}{b_K} \\ \frac{a_2}{b_1} & \frac{a_2}{b_2} & \cdots & \frac{a_2}{b_K} \\ \cdots & \cdots & \cdots & \cdots \\ \frac{a_K}{b_1} & \frac{a_K}{b_2} & \cdots & \frac{a_K}{b_K} \end{pmatrix} \tag{4}$$

The spectral ratio index of A is the matrix $A/A \triangleq a^T (1/a)$. Clearly, the diagonal of A/A is given by $(1, \ldots, 1)$.

An SRC approach can include a step to identify a small subset of S ratios from the above K×K matrix, S<<K, that can reliably discriminate the edge $E_{AB}$ between A and B from other spatial features. Such a subset can be called spectral ratio index or signature of the edge $E_{AB}$. Succinctly, the edge signature of $E_{AB}$ is a set $$\epsilon_{AB} = \{(p_1, q_1, \rho_1), \ldots, (p_s, q_s, \rho_s), \rho_s = a_{p_z}/b_{q_z}, 1 \le S < K\} \tag{5}$$

The integer S is referred to as the length of the edge signature. A task can include finding edge signatures with the shortest possible lengths so that S<<K.

In order to extract spatial features such as edges, the edge signatures must be combined with a suitable spatial mask to obtain a joint spatio-spectral SRC mask; this provides a second step of an SRC approach. As in standard gray-scale image processing, the purpose of this mask is to compute the image response to a spatial structuring element. However, in SRC, the spatial mask is used in a fundamentally different manner. Whereas in gray-scale edge detection the response is single-valued and represents a weighted average of the intensity values of the pixels in the structuring element, in SRC the response is multi-valued and returns the ratios of suitably defined pixel pairs from that structuring element.

In the SRC mask, the band indices play the role of "weights" and summation of pixel intensities can be replaced by their division according to a pair of band indices. Therefore, starting from a given spatial mask, a joint-spatio spectral SRC mask can defined by retaining the spatial domain of the former and redefining its action in terms of spectral ratios corresponding to the bands from a given edge signature.

To illustrate the process of converting a spatial mask into a SRC mask, consider a gray-scale mask M whose response on a gray-scale image u is defined by the formula $$M(i, j) = \sum_{-N \le m, n \le N} \omega(m, n) u(i+m, j+n) \tag{6}$$

where u(i, j) is the pixel's intensity value at the center $\{i,j\}$ of the mask, w(m, n) are the weights at offsets $\{m,n\}$ relative to the center of the mask, and N is the diameter of M. It is assumed that M contains M distinct pixel pairs $\{u^{m-}(i, j), u^{m+}(i, j)\}_{m=1}^{M}$, centered at $\{i,j\}$, with weights $\{(w^{m-}, w^{m+}\}_{m=1}^{M}$, so that the response of M can be written more simply as a sum over all distinct pixel pairs as follows:

$$M(i, j) = \sum_{m=1}^{M} (\omega^{m-} u^{m-}(i, j) + \omega^{m+} u^{m+}(i, j)) \tag{7}$$

To explain this notation, consider the 3×3 single-band image 905 and the associated 3×3 mask 910 shown in FIG. 9. For this mask the distinct pixel pairs centered at $\{i, j\}$ are given by $$\{u(i,j-1), u(i,j+1)\};$$

$$\{u(i-1,j), u(i+1,j)\};$$

$$\{u(i-1,j-1), u(i+1,j+1)\};$$

and $\{u(i-1,j+1), u(i+1,j-1)\};$ \hfill (8)

respectively. Therefore, in this case M=4 and the following association can be made:

$$\{u^{1-}(i,j), u^{1+}(i,j)\} \rightarrow \{u(i,j-1), u(i,j+1)\};$$

$$\{u^{2-}(i,j), u^{2+}(i,j)\} \rightarrow \{u(i-1,j), u(i+1,j)\};$$

$$\{u^{3-}(i,j), u^{3+}(i,j)\} \rightarrow \{u(i-1,j-1), u(i+1,j+1)\};$$

$$\{u^{4-}(i,j), u^{4+}(i,j)\} \rightarrow \{u(i-1,j+1), u(i+1,j-1)\}; \tag{9}$$

Because the pixel pairs are used to define spectral ratios, the order of their elements is not important.

To define the response of the joint spatio-spectral SRC mask, the weights in M(i,j) can be discarded and the pixel pairs in M can be combined with the band indices from a given edge signature $\epsilon_{AB}$. The result is a mapping $K_{AB}$ $$K_{AB}: \mathbf{R}^{I \times J \times K} \mapsto \mathbf{R}^{I \times J \times (M \times S)} \tag{10}$$

from the three-dimensional MS or HS image cube with spatial dimensions I×J and a spectral dimension K into a smaller hypercube, with the same spatial dimensions I×J but with a reduced spectral dimension MS<<K. Recall that M denotes the number of distinct pairs of pixels involved in the mask and S is the length of the edge signature $\epsilon_{AB}$.

At every spatial location $\{i, j\}$, the response of $K_{AB}$ can be viewed as an M×S matrix of spectral ratios given by $$K_{AB}(i, j) = \tag{11}$$

$$\begin{pmatrix} \frac{u^{1-}_{p_1}(i,j)}{u^{1+}_{q_1}(i,j)} & \frac{u^{1-}_{p_2}(i,j)}{u^{1+}_{q_2}(i,j)} & \cdots & \frac{u^{1-}_{p_s}(i,j)}{u^{1+}_{q_s}(i,j)} \\ \frac{u^{2-}_{p_1}(i,j)}{u^{2+}_{q_1}(i,j)} & \frac{u^{2-}_{p_2}(i,j)}{u^{2+}_{q_2}(i,j)} & \cdots & \frac{u^{2-}_{p_s}(i,j)}{u^{2+}_{q_s}(i,j)} \\ \cdots & \cdots & \frac{u^{m-}_{p_n}(i,j)}{u^{m+}_{q_n}(i,j)} & \cdots \\ \frac{u^{M-}_{p_1}(i,j)}{u^{M+}_{q_1}(i,j)} & \frac{u^{M-}_{p_2}(i,j)}{u^{M+}_{q_2}(i,j)} & \cdots & \frac{u^{M-}_{p_s}(i,j)}{u^{M+}_{q_s}(i,j)} \end{pmatrix} \in \mathbf{R}^{M \times S}$$

In the sequel, the element (m, s) of the matrix in (5.11) can be denoted by $$\kappa^m_{AB}(i, j, s) = \frac{u^{m-}_{p_s}(i, j)}{u^{m+}_{q_\lambda}(i, j)} \tag{12}$$

The sequence of spectral ratios in each row of the matrix $K_{AB}(I, j)$ can be computed by using a distinct pixel pair and bands prescribed by a given edge signature. For example, if $K_{AB}$ is derived from the 3×3 mask shown in FIG. 9, then the first row corresponds to the ratios of the first pair of pixels $\{u^{1-}(i,j), u^{1+}(i,j)\}$, i.e., the horizontal pair $u(i, j-1)$ and $u(i, j+1)$, the second row corresponds to the second pair of pixels $\{u^{2-}(i,j), u^{2+}(i,j)\}$, i.e., the vertical pair $u(i-1,j)$ and $u(i+1,j)$, and so on.

$K_{AB}$ has a joint spatio-spectral character. As another example of the joint spatio-spectral character of $K_{AB}$, consider an example in which the spatial mask comprises the first two pairs in equation (9) and the edge signature has length 1, i.e., a case where M=2 and S=1. Therefore, at every spatial location $\{i, j\}$ the response $K_{AB}(i, j)$ is a 2×1 matrix. Computation of the row elements in this matrix is illustrated schematically in FIG. 2. This figure clearly shows that, unlike a conventional mask, $K_{AB}$ does not operate in a single image plane but instead fuses information from multiple planes and is not-separable into spectral and spatial components. The spectral plane for each element in $K_{AB}$ is selected through the edge signature $\epsilon_{AB}$, i.e., the indices $\{p,q\}$, in a way that enhances that feature.

In the following, an example formulation of the training and feature extraction stages of the SRC approach, where the manner in which $K_{AB}$ can be used to discriminate the edges between A and B, is provided. For clarity, selection criteria used to determine the edge signature (equation 5) are presented separately from the algorithm description.

For implementation of a SRC algorithm, consider, for simplicity, a SRC approach assuming two distinct materials A and B. The example algorithm has two stages: (1) a training step where the appropriate edge signatures can be determined and the associated three-dimensional SRC mask can be defined, and (2) a feature-extraction step where the response of this SRC mask on a given MS or HS image is used to effect the spatial feature extraction.

In the training stage, three key components include (1) selection of representative training data sets for materials A and B, (2) defining a selection criteria for determining the edge signature (equation 5), and (3) selection of a spatial mask M used to define the SRC mask in equation (11). The second step is essential for the success of the SRC approach.

The training stage can proceed as follows. Let $$a = \{a_k(i,j) \in \mathbf{R} : i \in I(A), j \in J(A), 1 \le k \le K\} \quad (13)$$

and $$b = \{b_k(i,j) \in \mathbf{R} : i \in I(B), j \in J(B), 1 \le k \le K\} \quad (14)$$

denote the training sets for classes A and B, respectively, where I(A), J(A), I(B), and J(B) are index sets that define the training samples. Using the training data, the class means $\bar{a} \in \mathbf{R}^K$ and $\bar{b} \in \mathbf{R}^K$ can be computed according to $$\bar{a} = \frac{1}{\dim(A)} \left( \sum_{i \in I(A), j \in J(A)} a_k(i,j) \right) \quad (15)$$

and $$\bar{b} = \frac{1}{\dim(B)} \left( \sum_{i \in I(A), j \in J(B)} b_k(i,j) \right) \quad (16)$$

and the spectral ratio index A/B according to equation (4). Using the chosen selection criteria, a subset of A/B can be identified that defines the edge signature $\epsilon_{AB}$, and an associated tolerance value $\epsilon_{AB}$. Using the spatial mask M and the edge index $\epsilon_{AB}$ the SRC mask $K_{AB}$ can be defined according to equation (11). In summary, the output from the training step includes (1) the edge signature $\epsilon_{AB}$; (2) the associated tolerance value $\epsilon_{AB}$; and (3) the SRC mask $K_{AB}$.

After completing the training stage, the feature extraction stage can be performed. At this step, $K_{AB}$ can be applied to a given multispectral image $u \in \mathbf{R}^{I \times J \times K}$. For each hyper-pixel $u(i, j)$, located at position $\{i, j\}$ with respect to the FPA, the stage can proceed as follows. First, the M×S ratios giving the response $K_{AB}(i, j)$ at $u(i, j)$ can be computed, as defined in equation (11). Recalling that M denotes the number of the distinct pixels pairs involved in the calculation of $K_{AB}(i,j)$ and S is the length of $\epsilon_{AB}$, i.e., the number of ratios used to discriminate the edge between A and B.

The response (calculated ratios) of the SRC mask at a given hyper-pixel $u(i, j)$ can then be used as an input to form an indicator matrix $$\chi(i,j) = \begin{pmatrix} \delta_1^1 & \delta_2^1 & \dots & \delta_S^1 \\ \delta_1^2 & \delta_2^2 & \dots & \delta_S^2 \\ \dots & \dots & \delta_s^m & \dots \\ \delta_1^M & \delta_2^M & \dots & \delta_S^M \end{pmatrix} \in \mathbf{R}^{M \times S} \quad (17)$$

for that pixel. The elements $\delta_s^m$ of equation (17) are assigned the values of 0 or 1 according to the following rule:

$$\delta_s^m = \begin{cases} 1 & \text{if } \begin{cases} \kappa_{AB}^m(i,j,s) \in p_s + [-\epsilon_{AB}, \epsilon_{AB}], \text{ or} \\ (\kappa_{AB}^m(i,j,s))^{-1} \in p_s + [-\epsilon_{AB}, \epsilon_{AB}] \end{cases} \\ 0 & \text{otherwise} \end{cases} \quad (18)$$

where $\epsilon_{AB}$ is the tolerance determined at the training step. The use of the both $k_{AB}^m(i,j,s)$ and its reciprocal $k_{AB}^m(i,j,s))^{-1}$ in equation (18) is required to account for the two possible material configurations at the m-th pixel pair $\{u^{m-}(i,j), u^{m+}(i,j)\}$ Specifically, the first ratio captures the case when $u^{m-}(i,j)$ is of class A and $u^{m+}(i,j)$ is of class B, whereas the reciprocal ratio is needed to account for the possibility that $u^{m-}(i,j)$ is of type B and $u^{m+}(i,j)$ is of type A. Therefore, the use of the two ratios removes dependence on the direction of the transition between A and B, and is similar to the use of the magnitude in the gradient operator to achieve its rotational invariance.

If the hyper-pixel pair $\{u_{p_s}^{m-}(i,j), u_{q_s}^{m+}(i,j)\}$ belongs to the same material type, then the test in equation (18) will force most, if not all, elements $\delta_s^m$ in the m-th row of $\lambda(i, j)$ to zero. Conversely, if the hyper-pixels forming the pair are from the two different materials, either $K_{AB}^m(i, j, s)$ or its reciprocal $(K_{AB}^m(i, j, s))^{-1}$ will be close to the ratio $p_s$ from the edge signature $\epsilon_{AB}$. As a result, the above test will set most if not all of the elements $\delta_s^m$ s in the m-th row of $\lambda(i, j)$ to one.

In summary, for a given pixel pair $\{u_{p_s}^{m-}(i,j), u_{q_s}^{m+}(i,j)\}$, the number of non-zeros in the associated m-th row of the indicator matrix reveals the number of times the response of the SRC mask $K_{AB}(i, j)$ has matched, to within the specified tolerance, the spectral ratios from the edge signature $\epsilon_{AB}$. Because the pixel pairs used to form the response $K_{AB}(i, j)$ correspond to different edge orientations, e.g., horizontal, vertical or diagonal, the number of ones in each row indicates the strength of the particular edge direction at position $\{i, j\}$.

The information contained in the rows of $\lambda(i, j)$ can be used to define an edge map $F_{AB}: \mathbf{R}^{I \times J \times K} \mapsto \mathbf{R}^{I \times J}$, i.e., a mapping that assigns the value 1 to pixel location $\{i, j\}$ if $u(i, j)$ belongs to an edge $E_{AB}$, and 0 otherwise, as follows, $u(i, j)$ can be classified as belonging to $E_{AB}$ if the edge strength in at least one direction, as measured by the number of ones in the rows of λ(i, j), exceeds a specified integer tolerance value $\tilde{S}$<S. If none of the edge strengths exceed $\tilde{S}$, then u(i, j)∈$E_{AB}$ and $F_{AB}$(u(i, j)) can be set to $F_{AB}$(u(i, j))=0.

This criterion can be conveniently expressed in terms of the matrix infinity norm. For a given matrix A∈$R^{K \times L}$ the infinity norm ‖Mv∞ is defined as the maximum absolute row sum of M:

$$\|M\|_\infty = \max_{1 \leq k \leq K} \sum_{l=1}^{L} |a_{kl}| \qquad (19)$$

Using this norm, the edge map $F_{AB}$: $R^{I \times J \times K} \mapsto R^{I \times J}$ can be defined as follows: given an integer 1≤$\tilde{S}$≤S, $$\mathcal{F}_{AB}(u(i,j)) = \begin{cases} 1 & \text{if } \|\chi\|_\infty \geq \tilde{S} \\ 0 & \text{if } \|\chi\|_\infty < \tilde{S} \end{cases} \qquad (20)$$

The value of the integer parameter $\tilde{S}$ can be used to adjust the sensitivity of the feature extraction step to, e.g., noise. For example, increasing $\tilde{S}$ makes the algorithm less sensitive to noise but more restrictive. Conversely, decreasing S makes the algorithm less restrictive but more sensitive to noise. A similar effect can be achieved by setting $\tilde{S}$=S and increasing or decreasing the number of ratios in the edge signature $\epsilon_{AB}$.

Extension of the above approach to three or more materials is straightforward. For the case of three distinct materials A, B and C, there are three possible edge classes: between A and B, between A and C, and between B and C. Accordingly, at the training stage three edge signatures, $\epsilon_{AB}$, $\epsilon_{AC}$, and $\epsilon_{BC}$, three tolerance values $\epsilon_{AB}$, $\epsilon_{AC}$, and $\epsilon_{BC}$, and three joint spatio-spectral masks $K_{AB}$, $K_{AC}$, and $K_{BC}$ can be defined.

At the feature extraction stage, the responses of $K_{AB}$, $K_{AC}$, and $K_{BC}$ can be used to identify the hyper-pixels belonging to edge $E_{AB}$ between A and B, edge $E_{AC}$ between A and C, and edge $E_{BC}$ between B and C. The final image segmentation is obtained by the union of the three edges:

$$E_{ABC} = E_{AB} \cup E_{AC} \cup E_{BC} \qquad (21)$$

Figure 10:
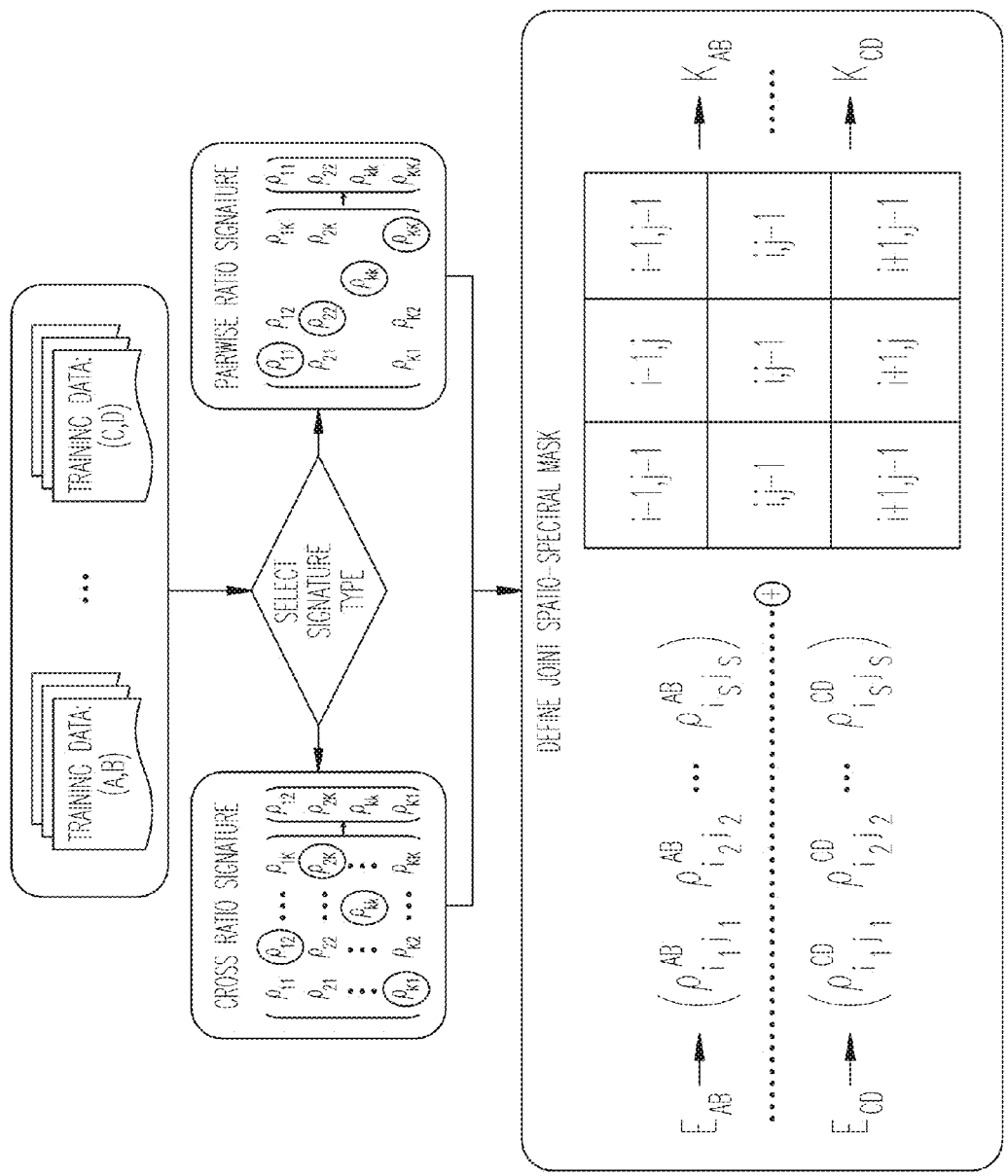
FIG. 10 shows a schematic of a training phase of a spectral ratio contrast algorithm, in accordance with various embodiments.
Figure 11:
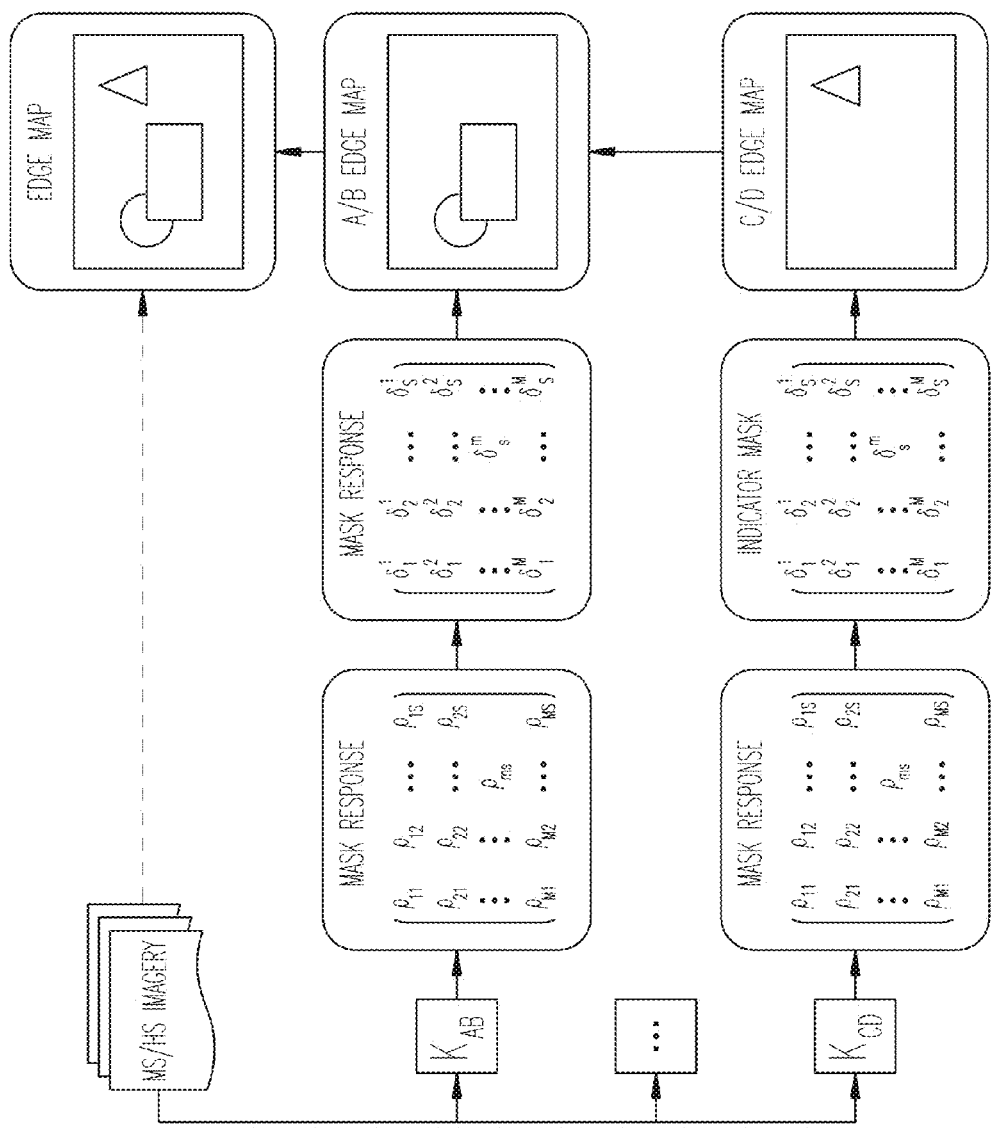
FIG. 11 shows a schematic of a training phase of a spectral ratio contrast algorithm, in accordance with various embodiments.

The training and testing phases of the SRC algorithm are shown schematically in FIGS. 10 and 11, respectively. Because the edge signatures and the associated tolerance values are determined independently for each pair of classes, the feature extraction depends only on the quality of the selection criteria used to obtain the edge signature for this pair and not on the strength of the edge, as measured by its MCG value. As a result, the SRC approach is particularly well suited to situations where the edge between two given materials is "weak," as measured by its MCG value, compared to the edges between the other materials in the scene. For scenes that contain both "weak" and "strong" edges, as measured by their MCG gradients, an MCG-based feature extraction would require locally adaptive threshold strategies to capture the "weak" edges. If a single, non-adaptive threshold is used, in order for MCG to pick the weak edges one has to increase the tolerance to a point where the noise level may become unacceptable.

The processing complexity of the SRC algorithm can be estimated by an estimate of the complexity of the feature extraction stage in the SRC algorithm, since the training stage is not included in the SRC complexity estimate because it is usually done off-line, before the actual image processing commences. Consider an HS or an MS image given by a hypercube with dimensions I×J×K. Recall that I×J is the dimension of the image plane whereas K is the number of spectral bands, which ranges from tens for MS images, to hundreds for HS images.

The cost of the feature extraction stage of SRC includes (1) the cost to compute the response $K_{AB}$(i, j) of the SRC mask at every pixel, including the reciprocal ratios $(K_{AB}^m(i,j,s))^{-1}$ needed in equation (18), (2) the cost to form the indicator matrix (5.12), and (3) the cost to compute the edge map according to equation (20). From these three steps the first one is the costliest, as it involves floating point arithmetic. The second and the third steps require mostly integer arithmetic and logical operations that are faster than floating point arithmetic. Nonetheless, for simplicity, in the cost estimate all operations can be counted as being the same, without regard to the fact that some of them take less CPU time to execute.

Computation of the response $K_{AB}$(i, j) at a single pixel (including the computation of the reciprocal ratios) takes 2MS operations. Thus, the total operation count for Step 1 is 2(I×J)×MS. Forming the indicator matrix at Step 2 is based on equation (18) and requires at most four comparisons. Therefore, the cost of forming a single entry of λ(i, j) is 4 operations, the cost of forming λ(i, j) is 4MS and the cost of forming λ(i, j) for all pixels is 4(I×J)×MS.

Finally, Step 3 requires computation of the matrix infinity norm of λ(i, j) for every pixel location {i, j}. Recall that the matrix infinity norm is the maximum absolute row sum of the matrix. Summing up the elements in a single row of λ(i, j) takes S−1 operations and so, computation of all row sums requires M(S−1) operations. In the worst-case scenario, finding the largest of these sums takes M−1 comparisons. It follows that the per-pixel cost of Step 3 is M(M−1)(S−1) operations, and the total cost of this step is (I×J)×M(M−1)(S−1).

An edge signature can be formed as a pairwise ratio edge index. In this section, a strategy is described in which the selection of the spectral ratios forming the edge signature $\epsilon_{AB}$ is restricted to the diagonal elements of the spectral ratio index A/B defined in equation (4). These ratios correspond to spectral bands with the same numbers, thus the term "pairwise ratios".

To motivate this strategy note that in the ideal case the spectral ratio index A/A for two identical materials has diagonal elements equal to one. Therefore, hyper-pixels from the same class will have nearly constant pairwise ratios close to 1, while hyper-pixels from different classes will have at least some of their pairwise ratios away from 1.

Variability of pairwise band ratios can play the same role for multi-color images as gray-scale discontinuity and similarity for gray-scale images. The objective is to define the pairwise ratio edge signatures using a small number of ratios (S<<K) that can discriminate the edges between the different class types. Roughly speaking, diagonal elements of the spectral ratio index A/B are sought that best capture the "shape" of its diagonal.

One fairly straightforward approach that performs well in practice, is to use the maximum and the minimum pairwise ratios, i.e., set $$\epsilon_{AR} = \{(k_{max}, k_{max}, \rho_{max}), (k_{min}, k_{min}, \rho_{min})\} \qquad (22)$$

where $k_{min}$ and $k_{max}$ are the band indices corresponding to the minimum and maximum diagonal elements of A/B, respectively. Note that for consistency with the notation in equation (5) both bands forming the ratio are stated explicitly even though they are the same.

The associated tolerances can be determined in several different ways. A good estimate can be obtained by computing the spread of the min and max ratios for the training data. For example, set $$\Delta_{min} = \max_{i,j} \frac{a_{k_{min}}(i,j)}{b_{k_{min}}(i,j)} - \min_{i,j} \frac{a_{k_{min}}(i,j)}{b_{k_{min}}(i,j)} \quad (23)$$

$$\Delta_{max} = \max_{i,j} \frac{a_{k_{max}}(i,j)}{b_{k_{max}}(i,j)} - \min_{i,j} \frac{a_{k_{max}}(i,j)}{b_{k_{max}}(i,j)}$$

and then define $$\epsilon_{min} = \tau \Delta_{min} \text{ and } \epsilon_{max} = \tau \Delta_{max} \quad (24)$$

for some positive $\tau$.

A 2-band pairwise min-max signature may provide the simplest possible signatures that capture the relevant variation in the band ratios. More complex pairwise signatures can be created by including additional band ratios in a recursive manner as follows. Starting from a basic 2-band min-max signature, a 3-band signature can obtained by adding the band corresponding to the next maximum ratio. Alternatively, a 4-band signature can be obtained by adding 2 bands for the next maximum and minimum ratios, or another 3-band signature by adding the band for the next minimum ratio. This process can be repeated until a satisfactory signature is obtained. Also, sensitivity to noise can be further reduced by increasing the number of pairwise band ratios in the signature, i.e., the number S in equation (20).

Because the choice of ratios in the pairwise strategy is limited to the diagonal elements of the spectral ratio index A/B in equation (4), it is clear that in some cases this strategy may not perform as well as a more general strategy that allows one to choose from all possible ratio combinations in A/B. For example, if two materials have hyper-pixels that are translations of each other, i.e., differ by a constant intensity factor, then the pairwise strategy will fail if the data is normalized. Likewise, a "weak" edge will have pairwise ratio close to one and so, its pairwise signature will be close to that of identical materials. Consequently, the pairwise approach will tend to miss weak edges.

An alternative ratio selection strategy that is not restricted to the diagonal elements of A/B can be realized by a cross-ratio edge index. In a general cross-ratio strategy for determining the edge signature e, the bands for each ratio can be selected in a two-step process and may be different, thus the term "cross-ratio." The key distinction between the cross-ratio approach and the pairwise approach in the last section is that now the choice of the ratios in the edge signature is not limited to the diagonal elements of the spectral contrast matrix $$A/B = \begin{pmatrix} \frac{a_1}{b_1} & \frac{a_1}{b_2} & \cdots & \frac{a_1}{b_K} \\ \frac{a_2}{b_1} & \frac{a_2}{b_2} & \cdots & \frac{a_2}{b_K} \\ \cdots & \cdots & \cdots & \cdots \\ \frac{a_K}{b_1} & \frac{a_K}{b_2} & \cdots & \frac{a_K}{b_K} \end{pmatrix} \quad (25)$$

A two-step procedure can be implemented that gives rise to edge signatures that enhance weak edges. Assume two materials A and B with representative hyper-pixels a and b, respectively. Let $1 < S \le K$ be a fixed integer. The case S=1 obviously gives a pairwise ratio and for this reason will not be considered below.

The first step in this strategy is to select the S bands where the classes A and B have maximum separation. Given representative hyper-pixels $\bar{a}$ and $\bar{b}$ for A and B, respectively, set $$i_1 = \arg\max_{1 \le i \le K} |\bar{a}_i - \bar{b}_i| \quad (26)$$

$$i_2 = \arg\max_{1 \le i \le K, i \ne i_1} |\bar{a}_i - \bar{b}_i|, \quad (27)$$

$$i_3 = \arg\max_{1 \le i \le K, i \ne i_1, i_2} |\bar{a}_i - \bar{b}_i| \quad (28)$$

and so on. After the S bands have been determined, the spectral ratios using all possible band combinations can be computed:

$$\rho_{pq} = \frac{\bar{a}_{i_p}}{\bar{b}_{i_q}}, 1 \le p, q \le S \quad (29)$$

Without loss of generality, it can be assumed that all ratios are less than or equal to one; if $p_{pq} > 1$ for some p and q it can be replaced by its reciprocal.

At the second step, $\epsilon_{AB}$ can be defined by selecting ratios that exhibit the strongest spectral contrast between the classes. To rank the ratios according to their spectral contrast, it is noted that owing to the assumption that all $p_{pq} \le 1$, the ratios closest to zero correspond to the strongest spectral contrast between any two bands. Thus, the first pair of bands, $\{p_1, q_1\}$ can be selected, as the pair corresponding to the smallest ratio:

$$\rho_1 = \rho_{p_1 q_1} = \arg\min_{1 \le p, q \le S} \rho_{pq} \quad (30)$$

the second pair of bands $\{p_2, q_2\}$, as the pair corresponding to the next smallest ratio, $$\rho_2 = \rho_{p_2 q_2} = \arg\min_{1 \le p, q \le S, p \ne p_1, q \ne q_1} \rho_{pq} \quad (31)$$

and so on. To define the edge signature, the first R ratios can be chosen as:

$$\epsilon_{AB} = \{(p_1, q_1, \rho_1), \ldots, (p_R, q_R, \rho_R)\} \quad (32)$$

As an example of the implementation of a joint spatio-spectral mask $K_{AB}$, consider the fusing of the edge signature with a specific spatial mask M. For simplicity, consider the 3×3 spatial mask M shown in FIG. 9. Recall that for this mask M=4, i.e., M has four distinct pixel pairs given by equation (9). Let $\epsilon_{AB}$ be an edge signature with length S>0. Using $E_{AB}$ in conjunction with the mask M yields a joint spatio-spectral mask $K_{AB}$ $$\mathcal{K}_{AB}: \mathbf{R}^{I \times J \times K} \mapsto \mathbf{R}^{I \times J \times (4 \times S)} \quad (33)$$

whose response at a hyper-pixel u(i, j) is given by the 4×S matrix $$K_{AB}(i,j) = \begin{pmatrix} \frac{u_{p_1}^{1-}(i,j)}{u_{q_1}^{1+}(i,j)} & \frac{u_{p_2}^{1-}(i,j)}{u_{q_2}^{1+}(i,j)} & \cdots & \frac{u_{p_s}^{1-}(i,j)}{u_{q_s}^{1+}(i,j)} \\ \frac{u_{p_1}^{2-}(i,j)}{u_{q_1}^{2+}(i,j)} & \frac{u_{p_2}^{2-}(i,j)}{u_{q_2}^{2+}(i,j)} & \cdots & \frac{u_{p_s}^{2-}(i,j)}{u_{q_s}^{2+}(i,j)} \\ \frac{u_{p_1}^{3-}(i,j)}{u_{q_1}^{3+}(i,j)} & \frac{u_{p_2}^{3-}(i,j)}{u_{q_2}^{3+}(i,j)} & \cdots & \frac{u_{p_s}^{3-}(i,j)}{u_{q_s}^{3+}(i,j)} \\ \frac{u_{p_1}^{4-}(i,j)}{u_{q_1}^{4+}(i,j)} & \frac{u_{p_2}^{4-}(i,j)}{u_{q_2}^{4+}(i,j)} & \cdots & \frac{u_{p_s}^{4-}(i,j)}{u_{q_s}^{4+}(i,j)} \end{pmatrix} \quad (34)$$

as defined in equation (11). The associated indicator matrix $\lambda(i,j)$ defined from this output according to equation (18) measures the strength of the edges along the horizontal, vertical and two diagonal image axes.

Definition of equation (33) can be easily modified by adding or removing pixel pairs. For example, a simpler definition of $K_{AB}$ results from using only the first two pixel pairs $\{u^{1-}(i,j), u^{1+}(i,j)\}$ and $\{u^{2-}(i,j), u^{2+}(i,j)\}$ from M. In this case M=2, $K_{AB}: R^{I \times J \times K} \mapsto R^{I \times J \times (2 \times S)}$ and the response of $K_{AB}$ at a hyperpixel $u(i,j)$ is given by the 2×S matrix $$K_{AB}(i,j) = \begin{pmatrix} \frac{u_{p_1}^{1-}(i,j)}{u_{q_1}^{1+}(i,j)} & \frac{u_{p_2}^{1-}(i,j)}{u_{q_2}^{1+}(i,j)} & \cdots & \frac{u_{p_s}^{1-}(i,j)}{u_{q_s}^{1+}(i,j)} \\ \frac{u_{p_1}^{2-}(i,j)}{u_{q_1}^{2+}(i,j)} & \frac{u_{p_2}^{2-}(i,j)}{u_{q_2}^{2+}(i,j)} & \cdots & \frac{u_{p_s}^{2-}(i,j)}{u_{q_s}^{2+}(i,j)} \end{pmatrix} \quad (35)$$

The indicator matrix derived from this response measures the strength of the edges only along the horizontal and the vertical image axes.

In various implementations, by choosing bands with maximum separation and allowing unrestricted band combinations to form the ratios, edge signatures can be defined with the minimal possible length which perform as well as the longer edge signatures whose ratios are restricted to the diagonal of the spectral contrast matrix. This is an important result because it enables potentially significant data compression with minimal loss of the ability to extract the spatial features.

In various embodiments, a joint spatio-spectral approach can be implemented for image segmentation of MS and HS images. The SRC algorithm differs from the existing edge detection methodologies for such images in several important ways. Unlike the multi-color gradient (MCG) or the morphological color gradient (MoCG) approaches, the SRC algorithm is not an extension of an existing gray-scale processing methodology, instead it is designed from the onset as a dedicated MS/HS edge detection algorithm. In particular, the SRC algorithm fuses a given spatial mask with the spectral band ratios from a given edge signature into a non-separable, three-dimensional spatio-spectral mask.

Another equally important distinction is that an SRC approach utilizes the concept of the spectral ratio contrast to estimate similarity and discontinuity in a given HS/MS image, rather than measuring the rate of change in the image, as in the MCG and MoCG algorithms. Among other things, by requiring only a few bands per edge signature, the use of spectral ratios in the SRC enables unprecedented levels of data compression at the feature extraction stage. This aspect of the SRC approach is particularly attractive for HS images, for which the number of bands can be as high as several hundred. Another distinction between the SRC technique and other approaches is that the SRC technique is a two-stage procedure comprising a training phase and a feature extraction phase.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. A method comprising:
    acquiring image data at an interface of a system;
    integrating spectral information, at an edge between two materials in the image data, with spatial feature extraction of the image data such that a joint spatio-spectral mask is generated using a processor, the joint spatio-spectral mask being non-separable into spectral and spatial components, providing simultaneous spatial and spectral feature selection of the image data; and
    generating an image to a device based on the simultaneous spatial and spectral feature selection.

2. The method of claim 1, wherein integrating spectral information includes using a matrix of spectral ratios between the two materials at the edge.

3. The method of claim 1, wherein the method includes extracting information regarding bias voltages to a sensor in sensing the image data to integrate the spectral information.

4. The method of claim 1, wherein acquiring image data includes using only a set of biases determined to be relevant biases to sense the image data.

5. A method comprising:
    operating an apparatus such that operating the apparatus includes:
        acquiring image data,
        identifying spectral bands that maximize spectral contrast between two materials in the image data;
        defining an edge signature for an edge between the two materials using a ratio of the identified spectral bands;
        combining the edge signature with a spatial mask to obtain a joint spatio-spectral mask;
        extracting the edge from the image data using the joint spatio-spectral mask; and
        generating an image, including the extracted edge, to a device.

6. The method of claim 5, wherein the method includes extracting information regarding bias voltages to a sensor in sensing the image data to integrate the spectral information.

7. The method of claim 5, wherein acquiring image data includes using only a set of biases determined to be relevant biases to a sensor to sense the image data.

8. A machine-readable non-transitory storage medium having instructions stored thereon, which when executed by a processor, cause a machine to perform operations comprising:
    acquiring image data at an interface of the machine;
    integrating spectral information, at an edge between two materials in the image data, with spatial feature extraction of the image data such that a joint spatio-spectral mask is generated, the joint spatio-spectral mask being non-separable into spectral and spatial components, providing simultaneous spatial and spectral feature selection of the image data; and generating an image to a device based on the simultaneous spatial and spectral feature selection.

9. The machine-readable non-transitory storage medium of claim 8, wherein integrating spectral information includes using spectral ratios at the edge.

10. The machine-readable non-transitory storage medium of claim 8, wherein the instructions include extracting information regarding bias voltages to a sensor in sensing the image data to integrate the spectral information.

11. The machine-readable non-transitory storage medium of claim 8, wherein acquiring image data includes using only a set of biases determined to be relevant biases to sense the image data.

12. The machine-readable non-transitory storage medium of claim 8, wherein the instructions include:
identifying spectral bands that maximize spectral contrast between two materials in the image data;
defining an edge signature for an edge between the two materials using ratios of the identified spectral bands;
combining the edge signature with a spatial mask to obtain the joint spatio-spectral mask;
extracting the edge from the image data using the joint spatio-spectral mask; and
generating the image, including the extracted edge, to the device.

13. An apparatus comprising:
an interface to receive image data;
a processor; and
a memory operatively coupled to the processor, the memory having instructions stored thereon, which when executed by the processor, cause the apparatus to perform operations to:
acquire image data;
integrate spectral information, at an edge between two materials in the image data, with spatial feature extraction of the image data such that a joint spatio-spectral mask is generated, the joint spatio-spectral mask being non-separable into spectral and spatial components, providing simultaneous spatial and spectral feature selection of the image data; and
generate an image to a device based on the simultaneous spatial and spectral feature selection.

14. The apparatus of claim 13, wherein the apparatus is configured to integrate spectral information using spectral ratios at the edge.

15. The apparatus of claim 13, wherein the apparatus is configured to extract information regarding bias voltages to a sensor in sensing the image data to integrate the spectral information.

16. An apparatus comprising:
an interface to receive image data;
a processor; and
a memory operatively coupled to the processor, the memory having instructions stored thereon, which when executed by the processor, cause the apparatus to perform operations to:
acquire image data;
integrate spectral information, at an edge between two materials in the image data, with spatial feature extraction of the image data, providing simultaneous spatial and spectral feature selection of the image data; and
generate an image to a device based on the simultaneous spatial and spectral feature selection, wherein the instructions include instructions to:
identify spectral bands that maximize spectral contrast between the two materials in the image data;
define an edge signature for the edge between the two materials using ratios of the identified spectral bands;
combine the edge signature with a spatial mask to obtain a joint spatio-spectral mask;
extract the edge from the image data using the joint spatio-spectral mask; and
generate the image, including the extracted edge, to the device.

17. The apparatus of claim 13, where the device includes a display or a printing unit.

18. An apparatus comprising:
a sensor; and
a processing unit operatively coupled to the sensor, the processing unit configured to:
acquire image data sensed by the sensor;
integrate spectral information, at an edge between two materials in the image data, with spatial feature extraction of the image data such that a joint spatio-spectral mask is generated, the joint spatio-spectral mask being non-separable into spectral and spatial components, providing simultaneous spatial and spectral feature selection of the image data; and
generate an image to a device based on the simultaneous spatial and spectral feature selection.

19. The apparatus of claim 18, wherein the spectral information includes spectral ratios at the edge.

20. The apparatus of claim 18, wherein the processing unit is configured to extract information regarding bias voltages to the sensor to integrate the spectral information.

21. An apparatus comprising:
a sensor; and
a processing unit operatively coupled to the sensor, the processing unit configured to:
acquire image data sensed by the sensor;
integrate spectral information, at an edge between two materials in the image data, with spatial feature extraction of the image data, providing simultaneous spatial and spectral feature selection of the image data; and
generate an image to a device based on the simultaneous spatial and spectral feature selection, wherein the processing unit is configured to:
identify spectral bands that maximize spectral contrast between the two materials in the image data;
define an edge signature for the edge between the two materials using ratios of the identified spectral bands;
combine the edge signature with a spatial mask to obtain a joint spatio-spectral mask;
extract the edge from the image data using the joint spatio-spectral mask; and
generate the image, including the extracted edge, to the device.

22. The apparatus of claim 18, wherein the sensor includes a quantum-dot in a well (DWELL) infrared (IR) focal plane array (FPA).

23. The apparatus of claim 18, where the device includes a memory.

* * * * *

UNITED STATES PATENT AND TRADEMARK OFFICE
CERTIFICATE OF CORRECTION

PATENT NO. : 8,649,607 B1
APPLICATION NO. : 13/013744
DATED : February 11, 2014
INVENTOR(S) : Hayat et al.

Page 1 of 1

It is certified that error appears in the above-identified patent and that said Letters Patent is hereby corrected as shown below:

In the Claims

In column 18, line 15, in Claim 17, delete "where" and insert --wherein--, therefor In column 18, line 63, in Claim 23, delete "where" and insert --wherein--, therefor Signed and Sealed this
Second Day of December, 2014

Michelle K. Lee
*Deputy Director of the United States Patent and Trademark Office*